(12) United States Patent
Luo et al.

(10) Patent No.: US 12,216,375 B2
(45) Date of Patent: Feb. 4, 2025

(54) ELECTRONIC PAPER DISPLAY MODULE

(71) Applicants: Chengdu BOE Optoelectronics Technology Co., Ltd., Sichuan (CN); BOE Technology Group Co., Ltd., Beijing (CN)

(72) Inventors: Hao Luo, Beijing (CN); Yin Deng, Beijing (CN); Bo Wu, Beijing (CN); Dongmei Wei, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 736 days.

(21) Appl. No.: 17/446,121

(22) Filed: Aug. 26, 2021

(65) Prior Publication Data

US 2022/0121079 A1     Apr. 21, 2022

(30) Foreign Application Priority Data

Oct. 21, 2020 (CN) .......................... 202022362155.3

(51) Int. Cl.
*G02F 1/16766* (2019.01)
*G02F 1/167* (2019.01)
*G02F 1/16755* (2019.01)

(52) U.S. Cl.
CPC .......... *G02F 1/16766* (2019.01); *G02F 1/167* (2013.01); *G02F 1/16755* (2019.01)

(58) Field of Classification Search
CPC .... G02F 1/167; G02F 1/1676; G02F 1/13718; G02F 1/1335; G02F 1/1343; G02F 1/1345; G02F 1/13473; G02F 1/16755; G02F 1/16766; G02F 2201/343; G02F 1/133512; G02F 1/133742; G02F 1/134309; G02F 1/136227; G02F 1/13306; G02F 1/13452; G02F 1/13338; G02F 1/16757; G02F 1/1685; H01L 27/1222; H01L 27/1225; H01L 27/124; H01L 27/1248; H01L 27/1251; H01L 27/127; H01L 27/1288; H01L 29/66757; H01L 29/66969; H01L 29/78675; H01L 29/7869

See application file for complete search history.

(56) References Cited

U.S. PATENT DOCUMENTS

2016/0349901 A1\* 12/2016 Li ........................... G06F 3/044
2017/0293134 A1\* 10/2017 Otterstrom ......... A61B 1/00126
2018/0213638 A1\* 7/2018 Osawa .................... G06F 3/044

FOREIGN PATENT DOCUMENTS

JP            201020513    \*  2/2019  .............. G02F 1/17

\* cited by examiner

*Primary Examiner* — Brandi N Thomas
(74) *Attorney, Agent, or Firm* — IPro, PLLC

(57) ABSTRACT

The present disclosure provides an electronic paper display module, including an array substrate and an electronic paper film arranged opposite to each other. The electronic paper film includes a common electrode, the array substrate includes a display region and a peripheral region, and a common electrode lead is located at the peripheral region. An orthogonal projection of the electronic paper film onto the array substrate at least covers the display region, and the common electrode lead is provided with a hollowed-out region.

13 Claims, 6 Drawing Sheets

ELECTRONIC PAPER DISPLAY MODULE

CROSS-REFERENCE TO RELATED APPLICATIONS

The present disclosure claims a priority of the Chinese Patent Application No. 202022362155.3 filed on Oct. 21, 2020, which is incorporated herein by reference in its entirety.

TECHNICAL FIELD

The present disclosure relates to the field of display technology, in particular to an electronic paper display module.

BACKGROUND

At present, for the preparation of flexible electronic paper, a Polyimide (PI) film needs to be peeled off from a glass substrate. Cracks mainly occur at edges and corners of an electronic paper film when the PI film is peeled and a bending test is carried out. In addition, usually the electronic paper film is provided with protrusions at the cracks at the edges.

SUMMARY

An object of the present disclosure is to provide an electronic paper display module, so as to solve the problem in the related art where cracks occur for a common electrode lead due to a stress of the protrusions of the electronic paper film when the electronic paper film is peeled.

The present disclosure provides in some embodiments an electronic paper display module, including an array substrate and an electronic paper film arranged opposite to each other. The electronic paper film includes a common electrode; the array substrate includes a display region and a peripheral region, and a common electrode lead is located at the peripheral region; and an orthogonal projection of the electronic paper film onto the array substrate at least covers the display region, and the common electrode lead is provided with a hollowed-out region.

In a possible embodiment of the present disclosure, the common electrode lead is hollowed out at a part of the hollowed-out region.

In a possible embodiment of the present disclosure, the common electrode lead is a grid-shaped lead at the hollowed-out region.

In a possible embodiment of the present disclosure, the orthogonal projection of the electronic paper film onto the array substrate only covers the display region.

In a possible embodiment of the present disclosure, the array substrate further includes a base substrate arranged at a side of the common electrode lead away from the electronic paper film; a minimum distance between an edge line of the orthogonal projection of the electronic paper film onto the base substrate and an edge line of an orthogonal projection of the hollowed-out region onto the base substrate is a first predetermined spacing; and the first predetermined spacing is greater than or equal to 10 microns and less than or equal to 200 microns.

In a possible embodiment of the present disclosure, the peripheral region includes a first peripheral region and a second peripheral region, and the first peripheral region, the display region and the second peripheral region are arranged in a first direction; the common electrode lead is arranged at the first peripheral region, and a maximum distance between a side of the edge line of the orthogonal projection of the electronic paper film onto the base substrate closest to the first peripheral region and the edge line of the orthogonal projection of the hollowed-out region onto the base substrate in the first direction is a first predetermined distance; or the common electrode lead is arranged at the second peripheral region, and a maximum distance between a side of the edge line of the orthogonal projection of the electronic paper film onto the base substrate closest to the second peripheral region and the edge line of the orthogonal projection of the hollowed-out region onto the base substrate in the first direction is a second predetermined distance; or the common electrode lead includes a first common electrode lead and a second common electrode lead, the first common electrode lead is provided with a first hollowed-out region, the second common electrode lead is provided with a second hollowed-out region, the first common electrode lead is arranged at the first peripheral region, the second common electrode lead is arranged at the second peripheral region, a maximum distance between the side of the edge line of the orthogonal projection of the electronic paper film onto the base substrate closest to the first peripheral region and an edge line of an orthogonal projection of the first hollowed-out region onto the base substrate in the first direction is the first predetermined distance, and a maximum distance between the side of the edge line of the orthogonal projection of the electronic paper film onto the base substrate closest to the second peripheral region and an edge line of an orthogonal projection of the second hollowed-out region onto the base substrate in the first direction is the second predetermined distance. The first predetermined distance is greater than or equal to 200 microns and less than or equal to 500 microns, and the second predetermined distance is greater than or equal to 200 microns and less than or equal to 500 microns.

In a possible embodiment of the present disclosure, the orthogonal projection of the electronic paper film onto the array substrate covers the display region, and completely covers a region where the common electrode lead is located, and the common electrode lead is a grid-shaped lead.

In a possible embodiment of the present disclosure, the array substrate further includes a base substrate arranged at a side of the common electrode lead away from the electronic paper film; the peripheral region includes a first peripheral region and a second peripheral region, and the first peripheral region, the display region, and the second peripheral region are arranged in a first direction; the common electrode lead is arranged at the first peripheral region, and a minimum distance between an edge line of an orthogonal projection of the electronic paper film onto the base substrate and an orthogonal projection of the common electrode lead onto the base substrate in the first direction is a third predetermined distance; or the common electrode lead is arranged at the second peripheral region, and a minimum distance between the edge line of the orthogonal projection of the electronic paper film onto the base substrate and the orthogonal projection of the common electrode lead onto the base substrate in the first direction is a fourth predetermined distance; or the common electrode lead includes a first common electrode lead and a second common electrode lead, the first common electrode lead is arranged at the first peripheral region, the second common electrode lead is arranged at the second peripheral region, a minimum distance between the edge line of the orthogonal projection of the electronic paper film onto the base substrate and an orthogonal projection of the first common electrode lead onto the base substrate in the first direction is the third predetermined distance, and a minimum distance between the edge line of the orthogonal projection of the electronic paper film onto the base substrate and an orthogonal projection of the second common electrode lead onto the base substrate in the first direction is the fourth predetermined distance. The third predetermined distance is greater than or equal to 20 microns and less than or equal to 200 microns, and the fourth predetermined distance is greater than or equal to 20 microns and less than or equal to 200 microns.

In a possible embodiment of the present disclosure, the orthogonal projection of the electronic paper film onto the array substrate covers the display region, and partially covers a region where the common electrode lead is located.

In a possible embodiment of the present disclosure, a width of the hollowed-out region in the first direction is greater than or equal to 400 microns and less than or equal to 800 microns; and the peripheral region includes a first peripheral region and a second peripheral region, the common electrode lead is arranged at the first peripheral region and/or the second peripheral region, and the first peripheral region, the display region and the second peripheral region are arranged in the first direction.

In a possible embodiment of the present disclosure, an edge of the electronic paper film close to the array substrate is arc-shaped.

In a possible embodiment of the present disclosure, the array substrate further includes a base substrate, the base substrate includes a buffer layer and an insulation layer laminated one on another, the common electrode lead is located at a side of the insulation layer away from the buffer layer, and the insulation layer is arranged at a side of the common electrode lead away from the electronic paper film; the buffer layer is provided with a concave-convex region at a side close to the insulation layer, each concave is depressed in a direction away from the common electrode lead, and each convex is protruded in a direction close to the common electrode lead; and at least a part of the insulation layer and at least a part of the common electrode lead are deformed along with the concave-convex region of the buffer layer so as to form the hollowed-out region of the common electrode lead.

In a possible embodiment of the present disclosure, the common electrode lead is provided with a wavy or serrated edge.

In a possible embodiment of the present disclosure, the array substrate further includes a base substrate, the base substrate includes a base and an insulation layer, the insulation layer is arranged at a side of the common electrode lead away from the electronic paper film, and the base is arranged at a side of the insulation layer away from the common electrode lead; the insulation layer is provided with a plurality of stress release grooves, and an orthogonal projection of each stress release groove onto the base is located at a periphery of an orthogonal projection of the common electrode lead onto the base; and the orthogonal projection of each stress release groove onto the base is rectangular, and each stress release groove is depressed in a direction away from the common electrode lead.

According to the embodiments of the present disclosure, through the hollowed-out region, it is able to ensure the electrical conductivity of the product and prevent the occurrence of cracks.

The other aspects and advantages of the present disclosure will be given or may become apparent in the following description, or may be understood through the implementation of the present disclosure.

BRIEF DESCRIPTION OF THE DRAWINGS

The above-mentioned and/or the additional aspects and advantages of the present disclosure will become apparent and easily understandable in conjunction with the following drawings. In these drawings.

REFERENCE SIGN LIST

Figure 1:
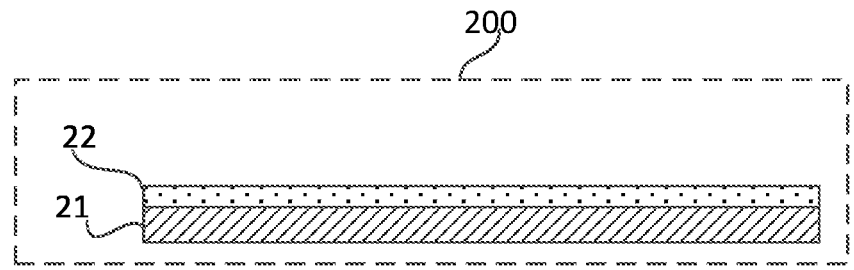
FIG. 1 is a schematic view showing an electronic paper film according to one embodiment of the present disclosure.

700—array substrate, 110—common electrode lead, 111—hollowed-out region, 211—first common electrode lead, 212—second common electrode lead, 221—first hollowed-out region, 222—second hollowed-out region, D1—first direction;

A0—display region, A1—peripheral region, A11—first peripheral region, A12—second peripheral region;

200—electronic paper film, 21—electronic ink capsule, 22—common electrode;

300—insulation layer, 310—stress release groove;

400—sealant;
500—protection film, 800—base substrate, 900—base;
600—buffer layer.

DETAILED DESCRIPTION

The present disclosure will be described hereinafter in conjunction with the embodiments and the drawings. Identical or similar reference numbers in the drawings represent an identical or similar element or elements having an identical or similar function. In addition, the detailed description about any know technology, which is unnecessary to the features in the embodiments of the present disclosure, will be omitted. The following embodiments are for illustrative purposes only, but shall not be used to limit the scope of the present disclosure.

Unless otherwise defined, any technical or scientific term used herein shall have the common meaning understood by a person of ordinary skills. Any term defined in a commonly-used dictionary shall be understood as having the meaning in conformity with that in the related art, shall not be interpreted idealistically and extremely.

Unless otherwise defined, such words as "one" or "one of" are merely used to represent the existence of at least one member, rather than to limit the number thereof. Such words as "include" or "including" intend to indicate that there are the features, integers, steps, operations, elements and/or assemblies, without excluding the existence or addition of one or more other features, integers, steps, operations, elements, assemblies and/or combinations thereof. In the case that one element is connected or coupled to another element, it may be directly connected or coupled to the other element, or an intermediate element may be arranged therebetween. At this time, the element may be connected or coupled to the other element in a wireless or wired manner. In addition, the expression "and/or" is used to indicate the existence of all or any one of one or more of listed items, or combinations thereof.

It is found through study that, when a flexible substrate is separated from a rigid glass substrate, or when a flexible electronic paper display module is subjected to a bending resistance test, cracks occur for an array substrate due to an excessive bending angle of the flexible substrate. This is because, stress concentration occurs at a protrusion at an edge of an electronic paper film when the flexible electronic paper display module is bent.

An object of the present disclosure is to provide an electronic paper display module, so as to solve the above-mentioned problem in the related art.

The technical solutions involved in the embodiments of the present disclosure and how to solve the above-mentioned problem through the technical solutions will be described hereinafter in details in conjunction with the embodiments.

The present disclosure provides in some embodiments an electronic paper display module which, as shown in FIGS. 1, 2, 3, 4 and 5, includes an array substrate and an electronic paper film 200 arranged opposite to each other.

As shown in FIG. 1, the electronic paper film 200 includes an electronic ink capsule 21 and a common electrode 22.

Figure 2:
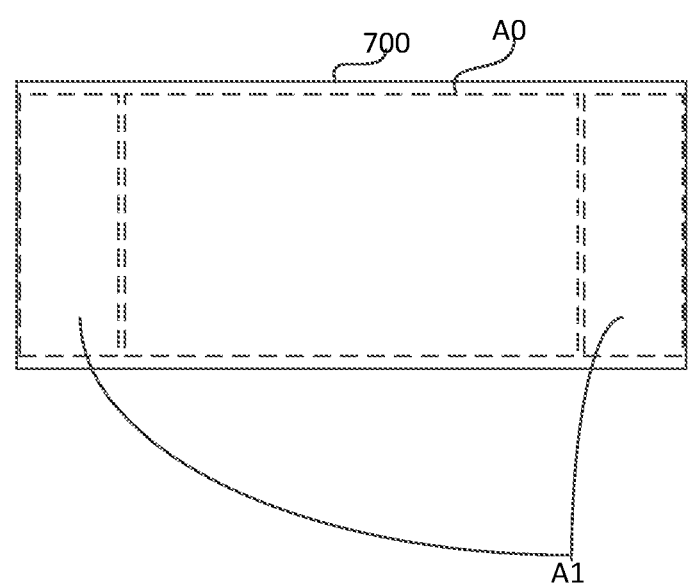
FIG. 2 is a schematic view showing regions of an array substrate according to one embodiment of the present disclosure.

As shown in FIG. 2, the array substrate 700 includes a display region A0 and a peripheral region A1.

The array substrate includes an array layer 100 arranged at the display region A0 and a common electrode lead 110 arranged at the peripheral region A1.

The array layer 100 includes a Thin Film Transistor (TFT) array layer and a pixel electrode layer arranged on a base substrate 800 sequentially, and the TFT array layer includes a gate metal layer, a gate insulation layer, an active layer, a source/drain metal layer and a passivation layer arranged on the base substrate 800 one on another.

An orthogonal projection 201 of the electronic paper film 200 onto the array substrate at least covers the display region A0, and the common electrode lead 110 is provided with a hollowed-out region 111.

According to the embodiments of the present disclosure, the electronic paper film 200 is arranged opposite to the array substrate and covers at least the display region A0 of the array substrate. In addition, the common electrode lead 110 is provided with the hollowed-out region 111 so as to prevent the occurrence of cracks for the common electrode lead 110 due to stress concentration of the electronic paper film 200, thereby to prevent or reduce a risk of being broken for the common electrode lead 110 due to the stress, and improve the yield of the product.

In addition, through the hollowed-out region 111, it is able to ensure the electrical conductivity of the product and prevent the occurrence of cracks.

In a possible embodiment of the present disclosure, the common electrode lead is hollowed out at a part of the hollowed-out region, and at the hollowed-out region, the common electrode lead is, but not limited to, a grid-shaped lead.

Figure 3:
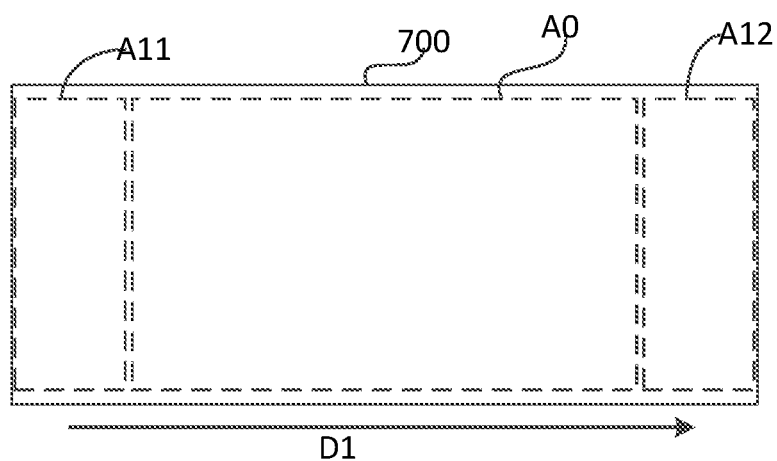
FIG. 3 is another schematic view showing the regions of the array substrate according to one embodiment of the present disclosure.

As shown in FIG. 3, on the basis of FIG. 2, the peripheral region includes a first peripheral region A11 and a second peripheral region A12. The first peripheral region A11 and the second peripheral region A12 are arranged at two opposite sides of the display region A0. The first peripheral region A11, the display region A0, and the first peripheral region A12 are arranged in a first direction D1.

In FIG. 3, A11 is arranged on the left of A0, A12 is arranged on the right of A0, and the first direction D1 is a horizontal direction.

In a possible embodiment of the present disclosure, the array layer 100 and the common electrode lead 110 are formed on the base substrate 800 during actual manufacture of the electronic paper display module. After cutting, the electronic paper film 200 is attached, an Integrated Circuit (IC) and a Flexible Printed Circuit (FPC) are bound, and then a PI film is peeled off from a glass base of the base substrate, so as to acquire the flexible electronic paper display module.

In a possible embodiment of the present disclosure, the base substrate includes a base, a buffer layer and an insulation layer laminated one on another, the buffer layer and the insulation layer are arranged on the base sequentially, the buffer layer is arranged at a side of the common electrode lead away from the electronic paper film, and the base is arranged at a side of the buffer layer away from the common electrode lead.

In a possible embodiment of the present disclosure, the base is a glass base and the insulation layer is a PI film.

In a possible embodiment of the present disclosure, in actual use, a common electrode is electrically coupled to the common electrode lead 110 via a silver glue line. The common electrode lead 110 is electrically coupled to a TFT of the array substrate via a silver glue line.

Figure 4:
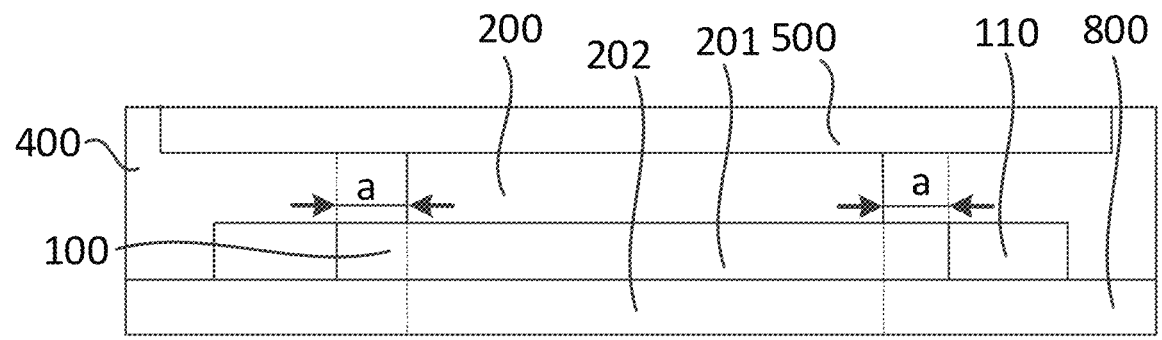
FIG. 4 is a schematic view showing an electronic paper display module according to one embodiment of the present disclosure.

In some embodiments of the present disclosure, as shown in FIG. 4, the electronic paper film 200 covers only the display region of the array substrate. That is, an orthogonal projection 201 of the electronic paper film 200 onto the array substrate is separated from a region where the common electrode lead 110 is located.

Through defining a distance between the electronic paper film 200 and the common electrode lead 110 of the array substrate, it is able to prevent the array substrate from being adversely affected by the stress concentration during the peeling, thereby to improve the yield of the flexible electronic paper.

Figure 6A:
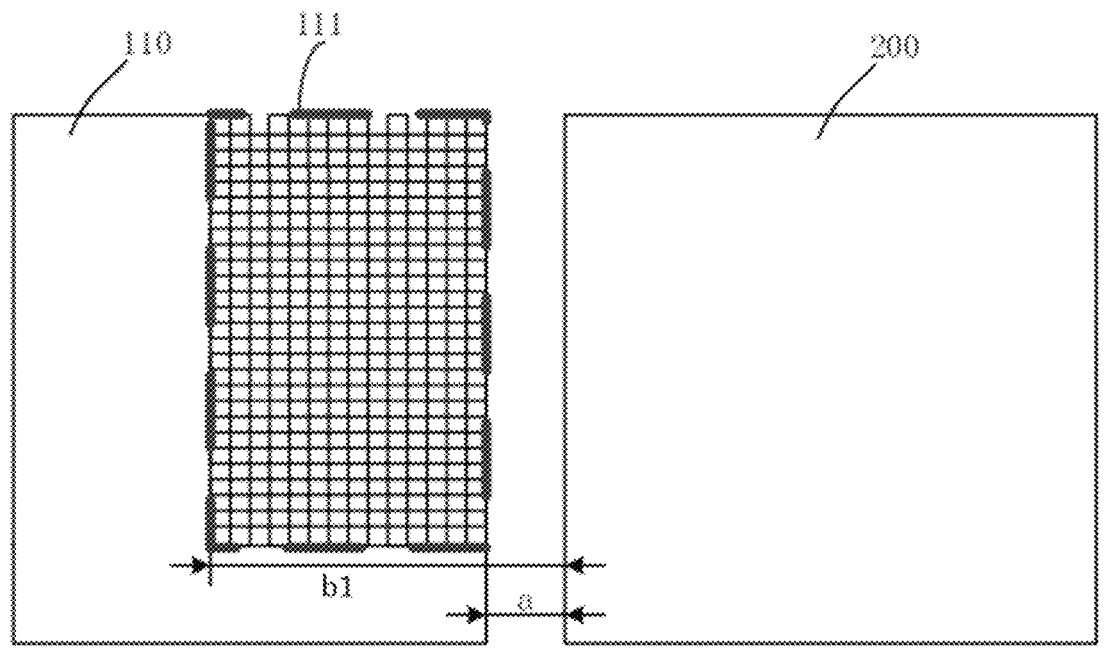
FIG. 6a is a schematic view showing the electronic paper display module according to one embodiment of the present disclosure.
Figure 6B:
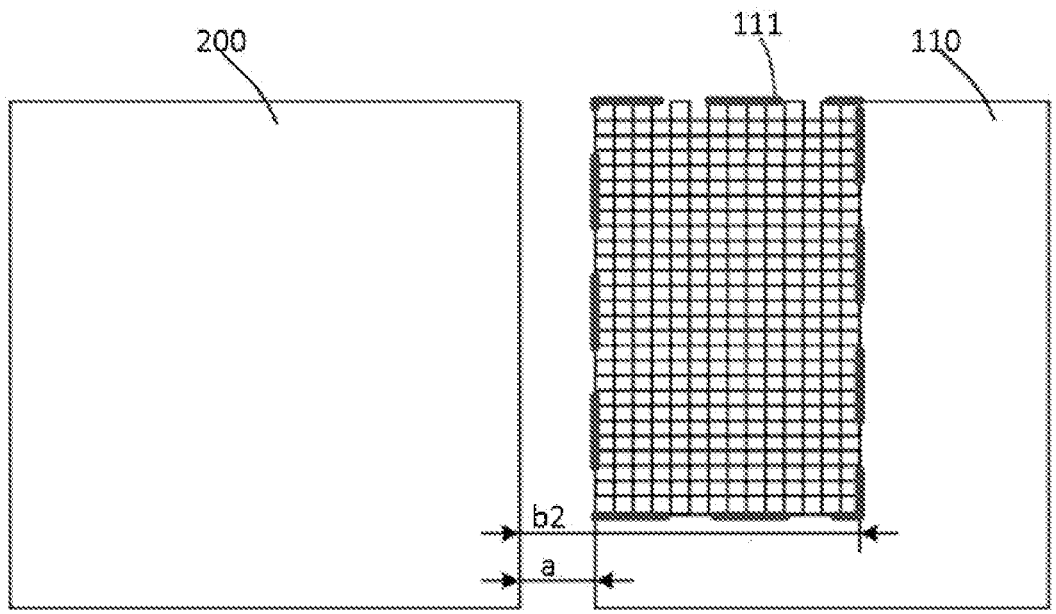
FIG. 6b is another schematic view showing the electronic paper display module according to one embodiment of the present disclosure.

Based on the above considerations, in some embodiments of the present disclosure, as shown in FIGS. 4, 6a and 6b, a minimum distance between an edge line of an orthogonal projection 202 of the electronic paper film 200 onto the base substrate 800 and an edge line of an orthogonal projection of the hollowed-out region 111 onto the base substrate 800 is a first predetermined spacing a.

In a possible embodiment of the present disclosure, assuming that a cutting tolerance of the electronic paper film 200 is X (usually within a range of ±100 μm) and an attachment tolerance of the electronic paper film 200 is Y (usually within a range of ±100 μm), the first predetermined spacing a is greater than X+Y.

In a possible embodiment of the present disclosure, the first predetermined spacing is greater than or equal to 10 microns and less than or equal to 200 microns.

Figure 5:
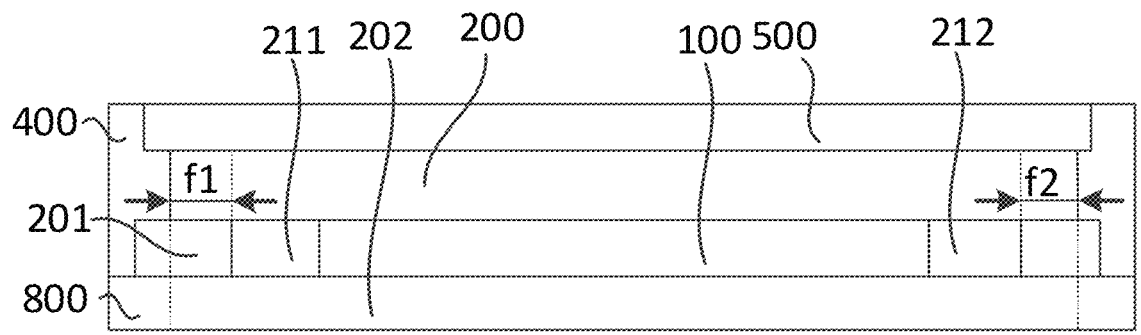
FIG. 5 is another schematic view showing the electronic paper display module according to one embodiment of the present disclosure.

In some embodiments of the present disclosure, as shown in FIG. 5, the electronic paper film 200 is arranged opposite to the array substrate 100, and the orthogonal projection 201 of the electronic paper film 200 onto the array substrate covers the display region and completely covers the region where the common electrode lead is located. In a possible embodiment of the present disclosure, the common electrode lead includes a first common electrode lead 211 arranged at the first peripheral region and a second common electrode lead 212 arranged at the second peripheral region.

When the orthogonal projection 201 of the electronic paper film 200 onto the array substrate completely covers the region where the common electrode lead is located, it means that the orthogonal projection 202 of the electronic paper film 200 onto the base substrate 800 completely covers the orthogonal projection of the common electrode lead onto the base substrate 800.

Figure 7:
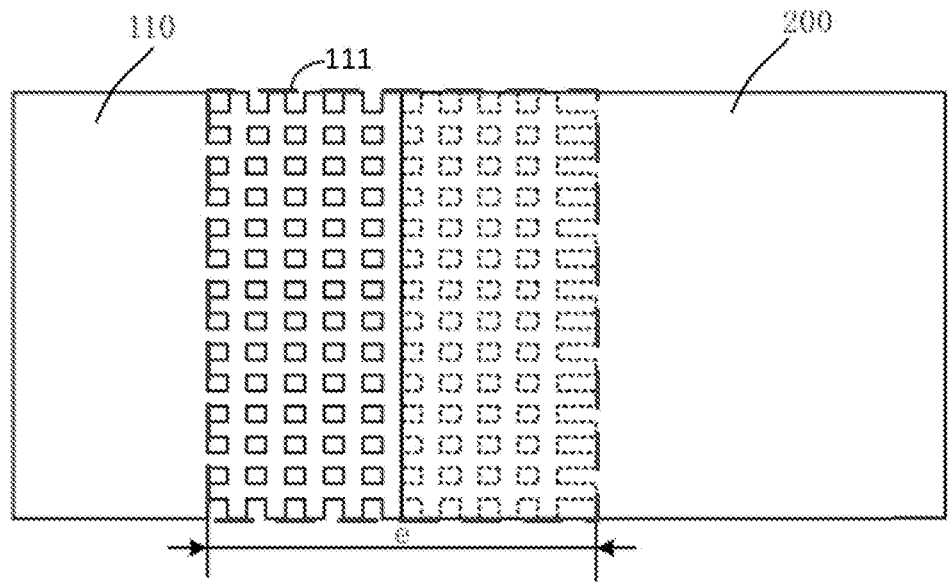
FIG. 7 is a schematic view showing the electronic paper display module according to one embodiment of the present disclosure.

In a possible embodiment of the present disclosure, as shown in FIG. 7, the common electrode lead 110 is a patterned lead, and the patterned common electrode lead 110 is grid-shaped.

In a possible embodiment of the present disclosure, the peripheral region includes a first peripheral region and a second peripheral region, and the first peripheral region, the display region, and the second peripheral region are arranged in a first direction. When the orthogonal projection 201 of the electronic paper film onto the array substrate covers the display region and completely covers the region where the common electrode lead is located, the common electrode lead is arranged at the first peripheral region, and a minimum distance between an edge line of the orthogonal projection 202 of the electronic paper film onto the base substrate and an orthogonal projection of the common electrode lead onto the base substrate in the first direction is a third predetermined distance; or the common electrode lead is arranged at the second peripheral region, and a minimum distance between the edge line of the orthogonal projection 202 of the electronic paper film onto the base substrate and the orthogonal projection of the common electrode lead onto the base substrate in the first direction is a fourth predetermined distance; or the common electrode lead includes a first common electrode lead and a second common electrode lead, the first common electrode lead is arranged at the first peripheral region, the second common electrode lead is arranged at the second peripheral region, a minimum distance between the edge line of the orthogonal projection 202 of the electronic paper film onto the base substrate and an orthogonal projection of the first common electrode lead onto the base substrate in the first direction is the third predetermined distance, and a minimum distance between the edge line of the orthogonal projection 202 of the electronic paper film onto the base substrate and an orthogonal projection of the second common electrode lead onto the base substrate in the first direction is the fourth predetermined distance. The third predetermined distance is greater than or equal to 20 microns and less than or equal to 200 microns, and the fourth predetermined distance is greater than or equal to 20 microns and less than or equal to 200 microns.

In some embodiments of the present disclosure, as shown in FIG. 5, the common electrode lead includes a first common electrode lead 211 arranged at the first peripheral region and a second common electrode lead 212 arranged at the second peripheral region. The minimum distance between the edge line of the orthogonal projection 202 of the electronic paper film 200 onto the base substrate 800 and the orthogonal projection of the first common electrode lead 211 onto the base substrate 800 is the third predetermined distance f1, and the minimum distance between the edge line of the orthogonal projection 202 of the electronic paper film 200 onto the base substrate 800 and the orthogonal projection of the second common electrode lead 212 onto the base substrate 800 is the fourth predetermined distance f2, where f1 is greater than or equal to 20 microns and less than or equal to 200 microns, and f2 is greater than or equal to 20 microns and less than or equal to 200 microns.

In a possible embodiment of the present disclosure, f1 is greater than X+Y, f2 is greater than X+Y, f1 is greater than or equal to 20 microns and less than or equal to 200 microns, and f2 is greater than or equal to 20 microns and less than or equal to 200 microns.

In a possible embodiment of the present disclosure, as shown in FIGS. 4 and 5, the array substrate further includes a base substrate 800, and the electronic paper display module further includes at least one of the following a sealant 400 and a protection film 500.

In a possible embodiment of the present disclosure, the base substrate 800 is arranged at a side of the array layer 100 away from the electronic paper film 200. The base substrate includes a buffer layer and an insulation layer arranged on a base sequentially, and the insulation layer is arranged at a side of the array layer 100 away from the electronic paper film 200.

In a possible embodiment of the present disclosure, the protection film 500 is a transparent, waterproof film arranged at the side of the electronic paper film 200 away from the array substrate. Identically, the protection film 500 is also arranged at a side of the insulation layer away from the array substrate 100.

In a possible embodiment of the present disclosure, the sealant 400 is used for encapsulating the electronic paper display module, arranged at one side of the insulation layer 300, and surrounds the protection film 500, the electronic paper film 200, the array layer 100 and the common electrode lead.

In a possible embodiment of the present disclosure, the peripheral region includes a first peripheral region and a second peripheral region, and the first peripheral region, the display region, and the second peripheral region are arranged in a first direction. The common electrode lead is arranged at the first peripheral region, and a maximum distance between a side of the edge line of the orthogonal projection 202 of the electronic paper film onto the base substrate closest to the first peripheral region and the edge line of the orthogonal projection of the hollowed-out region onto the base substrate in the first direction is a first predetermined distance; or the common electrode lead is arranged at the second peripheral region, and a maximum distance between a side of the edge line of the orthogonal projection 202 of the electronic paper film onto the base substrate closest to the second peripheral region and the edge line of the orthogonal projection of the hollowed-out region onto the base substrate in the first direction is a second predetermined distance; or the common electrode lead includes a first common electrode lead and a second common electrode lead, the first common electrode lead is provided with a first hollowed-out region, the second common electrode lead is provided with a second hollowed-out region, the first common electrode lead is arranged at the first peripheral region, the second common electrode lead is arranged at the second peripheral region, a maximum distance between the side of the edge line of the orthogonal projection 202 of the electronic paper film onto the base substrate closest to the first peripheral region and an edge line of an orthogonal projection of the first hollowed-out region onto the base substrate in the first direction is the first predetermined distance, and a maximum distance between the side of the edge line of the orthogonal projection 202 of the electronic paper film onto the base substrate closest to the second peripheral region and an edge line of an orthogonal projection of the second hollowed-out region onto the base substrate in the first direction is the second predetermined distance. The first predetermined distance is greater than or equal to 200 microns and less than or equal to 500 microns, and the second predetermined distance is greater than or equal to 200 microns and less than or equal to 500 microns.

In some embodiments of the present disclosure, as shown in FIG. 6a, the common electrode lead 110 is arranged at the first peripheral region (the first peripheral region is arranged on the left of the display region), and the first direction is a horizontal direction. The maximum distance between the side of the edge line of the orthogonal projection 202 of the electronic paper film 200 onto the base substrate closest to the first peripheral region (namely, a left side of the edge line of the orthogonal projection 202 of the electronic paper film 200 onto the base substrate) and the edge line of the orthogonal projection of the hollowed-out region 111 onto the base substrate in the first direction is the first predetermined distance b1. The first predetermined distance b1 is greater than or equal to 200 microns and less than or equal to 500 microns.

As shown in FIG. 6b, the common electrode lead 110 is arranged at the second peripheral region (the second peripheral region is on the right of the display region), and the first direction is a horizontal direction. The maximum distance between the side of the edge line of the orthogonal projection 202 of the electronic paper film 200 onto the base substrate closest to the second peripheral region (namely, the right side of the orthogonal projection of the edge line of the electronic paper film 200 onto the base substrate) and the edge line of the orthogonal projection of the hollowed-out region 111 onto the base substrate in the first direction is the second predetermined distance b2.

Figure 6C:
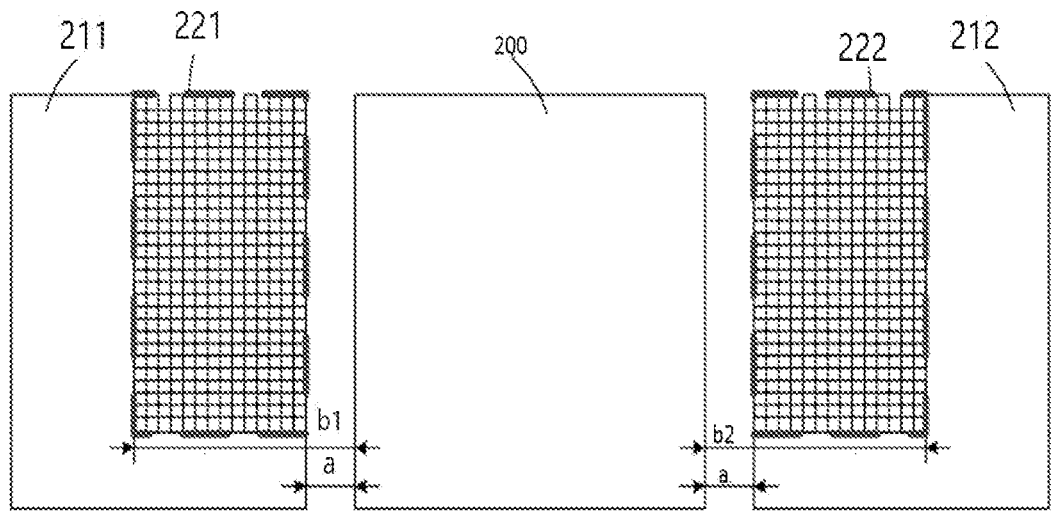
FIG. 6c is yet another schematic view showing the electronic paper display module according to one embodiment of the present disclosure.

As shown in FIG. 6c, the common electrode lead includes a first common electrode lead 211 and a second common electrode lead 212. The first common electrode lead 211 is provided with a first hollowed-out region 221, and the second common electrode lead 212 is provided with a second hollowed-out region 222. The first direction is a horizontal direction.

The first common electrode lead 211 is arranged at the first peripheral region (the first peripheral region is arranged on the left of the display region), and the second common electrode lead 212 is arranged at the second peripheral region (the second peripheral region is arranged on the right of the display region).

The maximum distance between the side (i.e. the left side) of the edge line of the orthogonal projection 202 of the electronic paper film 200 onto the base substrate closest to the first peripheral region and the edge line of the orthogonal projection of the first hollowed-out region 221 onto the base substrate in the first direction is the first predetermined distance b1. The maximum distance between the side (i.e. the right side) of the edge line of the orthogonal projection 202 of the electronic paper film 200 onto the base substrate closest to the second peripheral region and the edge line of the orthogonal projection of the second hollowed-out region 222 onto the base substrate in the first direction is the second predetermined distance b2.

The first predetermined distance b1 is greater than or equal to 200 microns and less than or equal to 500 microns, and the second predetermined distance b2 is greater than or equal to 200 microns and less than or equal to 500 microns.

In a possible embodiment of the present disclosure, as shown in FIGS. 6a and 6b, an area of the hollowed-out region 111 is smaller than an area of the common electrode lead 110. That is, a part of the common electrode lead 110 is provided with the hollowed-out region 111.

In a possible embodiment of the present disclosure, as shown in FIGS. 6a, 6b and 6c, the electronic paper film 200 is arranged opposite to the array substrate and covers only the display region of the array substrate.

In a possible embodiment of the present disclosure, as shown in FIGS. 6a, 6b and 6c, the cutting accuracy c of the electronic paper film 200 is ±100 μm, and the attaching accuracy d of the electronic paper film 200 is ±100 μm. In actual use, the first predetermined spacing a shall not be too large due to the existence of a frame, and usually it is 10 μm to 20 μm, i.e., it is impossible to completely avoid a value of c+d. Hence, in a possible embodiment of the present disclosure, the first predetermined distance b1 and the second predetermined distance b2 are each greater than or equal to a sum of an upper limit value of c and an upper limit value of d, i.e., greater than or equal to 200 μm.

In FIGS. 6a, 6b and 6c, a represents the first predetermined spacing.

In some embodiments of the present disclosure, as shown in FIG. 7, the electronic paper film 200 is arranged opposite to the array substrate, and covers the display region and partially covers the common electrode leads 110. In a possible embodiment of the present disclosure, a part of the edge line of the orthogonal projection 202 of the electronic paper film 200 onto the base substrate falls within the orthogonal projection of the hollowed-out region 111 onto the base substrate.

In a possible embodiment of the present disclosure, when the electronic paper film 200 partially covers the common electrode lead 110, it means that the orthogonal projection 202 of the electronic paper film 200 onto the base substrate partially covers the orthogonal projection of the common electrode lead 110 onto the base substrate.

In a possible embodiment of the present disclosure, as shown in FIG. 7, a width e of the hollowed-out region 111 in the first direction is greater than or equal to 400 microns and less than or equal to 800 microns. In FIG. 7, the first direction is a horizontal direction.

Figure 8:
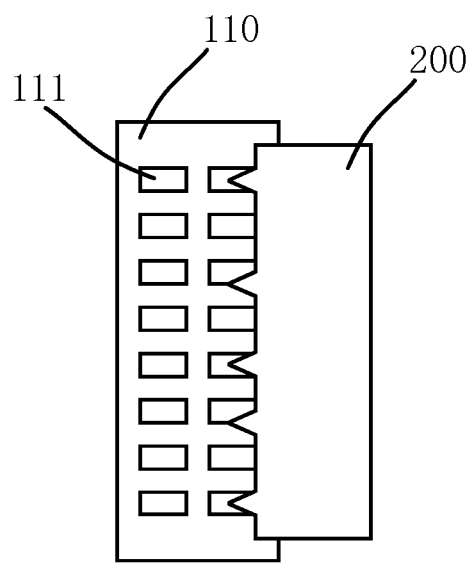
FIG. 8 is a schematic view showing a position relationship between a hollowed-out region and convexes at an edge of the electronic paper film 200 in the electronic paper display module in FIG. 7.

In a possible embodiment of the present disclosure, as shown in FIG. 8, orthogonal projections of protrusions on the electronic paper film 200 onto the array substrate are located at the hollowed-out region 111. Hence, during the peeling, it is impossible for the stress to be completely applied to the common electrode lead 110 due to the existence of the hollowed-out region 111, thereby to reduce the risk of the cracks.

In a possible embodiment of the present disclosure, as shown in FIG. 8, the hollowed-out region 111 includes a plurality of openings arranged at intervals and each having a rectangular shape. In a possible embodiment of the present disclosure, the openings are arranged in rows, and the protrusions of the electronic paper film 200 correspond to a row of the openings, so that a part of the stress is applied to the openings, and thereby it is impossible for all the stress to be applied to the common electrode lead 110. Identically, the hollowed-out region 111 also includes a plurality of grooves spaced apart from each other.

Based on the above-mentioned technical solutions, it is found that the yield of the electronic paper display module is increased by 20% or more.

Figure 9:
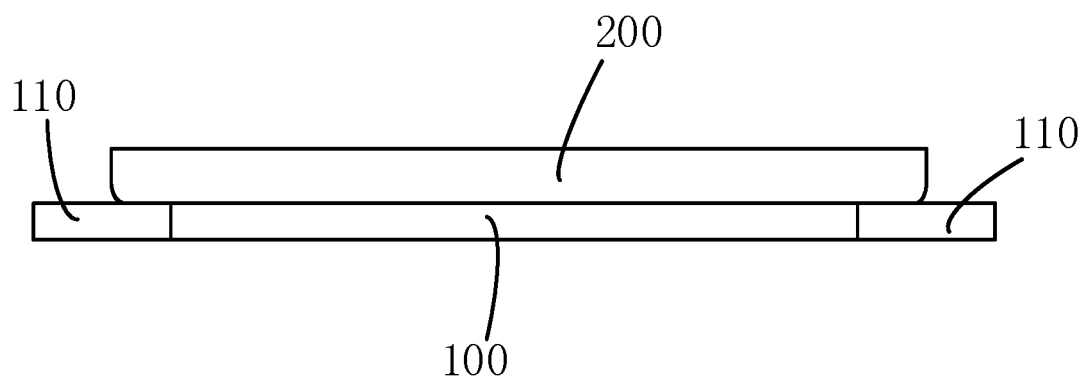
FIG. 9 is a schematic view showing a situation wherein an array layer 100, a common electrode lead 110 and the electronic paper film 200 cooperate in the electronic paper display module according to one embodiment of the present disclosure.

In some embodiments of the present disclosure, an edge of the electronic paper film 200 close to one side of the array substrate is arc-shaped, as shown in FIG. 9, so as to avoid stress concentration, thereby to further prevent or reduce the occurrence of the cracks for the common electrode lead 110.

Figure 10:
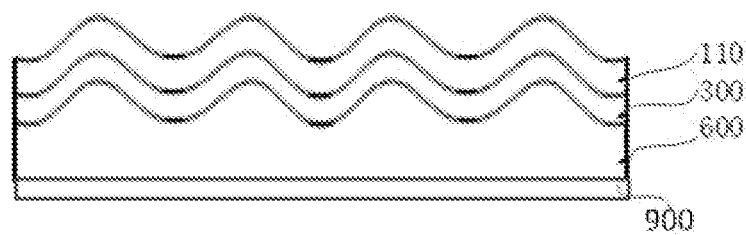
FIG. 10 is a schematic view showing a buffer layer, an insulation layer, the common electrode lead and a base in the electronic paper display module according to one embodiment of the present disclosure.

In some embodiments of the present disclosure, as shown in FIG. 10, the array substrate further includes a base substrate including a base 900, a buffer layer 600 and an insulation layer 300 laminated one on another. The common electrode lead 110 is located at a side of the insulation layer 300 away from the buffer layer 600.

The buffer layer 600 is provided with a concave-convex region at a side close to the insulation layer 300. In a direction perpendicular to a plane in which the buffer layer 600 is formed, each concave is depressed in a direction away from the common electrode lead 110, and ach convex is protruded in a direction close to the common electrode lead 110.

At least a part of the insulation layer 300 and at least a part of the common electrode lead 110 are deformed along with the concave-convex region of the buffer layer 600 so as to form the hollowed-out region 111 of the common electrode lead 110. The hollowed-out region 111 is also of a concave-convex shape.

In a possible embodiment of the present disclosure, the buffer layer 600 and the insulation layer 300 are laminated one on another on the substrate 900, i.e., the buffer layer 600 is arranged at one side of the substrate 900, and the insulation layer 300 is arranged at a side of the buffer layer 600 away from the substrate 900.

Figure 11:
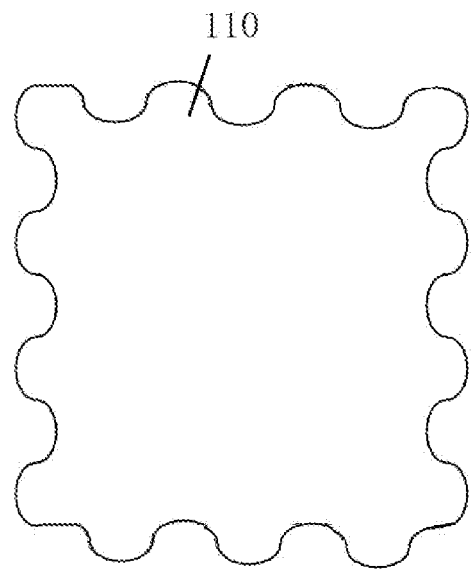
FIG. 11 is a top view of the common electrode lead in the electronic paper display module according to one embodiment of the present disclosure.

In a possible embodiment of the present disclosure, the edge of the common electrode lead 110 is wavy or serrated. Referring to FIG. 11, the edge of the common electrode lead 110 is curved, i.e., an example of a wavy form. The edge of the common electrode lead 110 is also serrated. In FIG. 11, the hollowed-out region 111 of the common electrode lead 110 is not shown.

In a possible embodiment of the present disclosure, through the wavy or serrated design, it is also able to avoid the stress concentration, thereby to further prevent or reduce the cracks for the common electrode lead 110.

Figure 12:
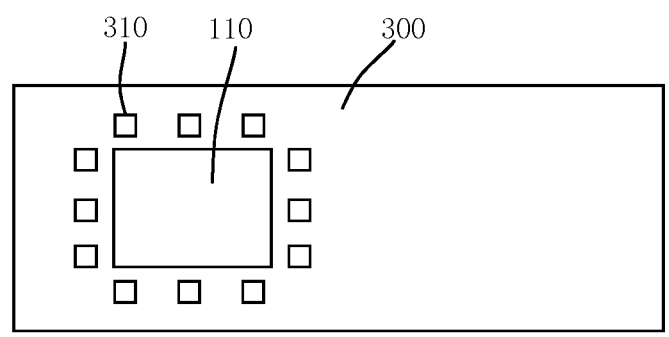
FIG. 12 is a schematic view showing a position relationship between an orthogonal projection of the insulation layer 300 onto a base substrate and an orthogonal projection of the common electrode lead 110 onto the base substrate in the electronic paper display module according to one embodiment of the present disclosure.

FIG. 12 shows a position relationship between the orthogonal projection of the insulation layer 300 onto the base substrate and the orthogonal projection of the common electrode lead 110 onto the base substrate.

In some embodiments of the present disclosure, as shown in FIG. 12, the array substrate further includes a base substrate, and the base substrate further includes a base and an insulation layer 300. The insulation layer 300 is provided with a plurality of stress release grooves 310, and an orthogonal projection of each stress release groove 310 onto the base is arranged at a periphery of the orthogonal projection of the common electrode lead 110 onto the base. In a direction perpendicular to a plane where the buffer layer 600 is formed, each stress release groove 310 is depressed in a direction away from the common electrode lead. As shown in FIG. 12, the orthogonal projection of each stress release groove 310 onto the base is rectangular.

In FIG. 12, the hollowed-out region 111 of the common electrode lead 110 is not shown. The insulation layer 300 is a single-layered or multi-layered insulation film layer, and a specific film layer structure is adjusted according to the practical need. Through the stress release grooves 310, it is able to avoid the stress concentration, thereby to further prevent or reduce the cracks for the common electrode lead 110.

Based on the same inventive concept, the present disclosure further provides in some embodiments a display device including the above-mentioned electronic paper display module.

The present disclosure at least has the following beneficial effects.

(1) The common electrode lead 110 is provided with the hollowed-out region 111, so it is able to prevent the occurrence of the cracks for the common electrode lead 110 due to the stress concentration no matter whether the electronic paper film 200 is arranged very close to the common electrode lead 110 or covers the common electrode lead 110, thereby to prevent the common electrode lead 110 from being broken and improve the yield.

(2) Through the hollowed-out region 111, it is impossible for the stress to be fully applied to the common electrode lead 110, thereby to reduce the risk of the cracks. In addition, through the hollowed-out region, it is able to ensure the electrical conductivity of the product and prevent the occurrence of cracks.

(3) Apart from a size design, it is able to further prevent or reduce the cracks for the common electrode lead 110 through providing the electronic paper film 200 with an arc-shaped edge at a side close to the array substrate, providing the common electrode lead 110 with the wavy or serrated edge or providing the stress release grooves surrounding the common electrode lead 110.

It should be appreciated that, steps, measures and schemes in various operations, methods and processes that have already been discussed in the embodiments of the present disclosure may be replaced, modified, combined or deleted. In a possible embodiment of the present disclosure, the other steps, measures and schemes in various operations, methods and processes that have already been discussed in the embodiments of the present disclosure may also be replaced, modified, rearranged, decomposed, combined or deleted. In another possible embodiment of the present disclosure, steps, measures and schemes in various operations, methods and processes that are known in the related art and have already been discussed in the embodiments of the present disclosure may also be replaced, modified, rearranged, decomposed, combined or deleted.

It should be further appreciated that, such words as "center", "on", "under", "front", "back", "left", "right", "vertical", "horizontal", "top", "bottom", "inner" and "outer" are used to indicate directions or positions as viewed in the drawings, and they are merely used to facilitate the description in the present disclosure, rather than to indicate or imply that a device or member must be arranged or operated at a specific position.

In addition, such words as "first" and "second" may merely be adopted to differentiate different features rather than to implicitly or explicitly indicate any number or importance, i.e., they may be adopted to implicitly or explicitly indicate that there is at least one said feature. Further, such a phrase as "a plurality of" may be adopted to indicate that there are two or more features, unless otherwise specified.

Unless otherwise specified, such words as "arrange" and "connect" may have a general meaning, e.g., the word "connect" may refer to fixed connection, removable connection or integral connection, or mechanical or electrical connection, or direct connection or indirect connection via an intermediate component, or communication between two components, or wired or wireless communication connection. The meanings of these words may be understood by a person skilled in the art in accordance with the practical need.

In the above description, the features, structures, materials or characteristics may be combined in any embodiment or embodiments in an appropriate manner.

It should be further appreciated that, although with arrows, the steps in the flow charts may not be necessarily performed in an order indicated by the arrows. Unless otherwise defined, the order of the steps may not be strictly defined, i.e., the steps may also be performed in another order. In addition, each of at least parts of the steps in the flow charts may include a plurality of sub-steps or stages, and these sub-steps or stages may not be necessarily performed at the same time, i.e., they may also be performed at different times. Furthermore, these sub-steps or stages may not be necessarily performed sequentially, and instead, they may be performed alternately with the other steps or at least parts of sub-steps or stages of the other steps.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An electronic paper display module, comprising an array substrate and an electronic paper film arranged opposite to each other, wherein
the electronic paper film comprises a common electrode;
the array substrate comprises a display region and a peripheral region, and a common electrode lead is located at the peripheral region; and
an orthogonal projection of the electronic paper film onto the array substrate at least covers the display region, and the common electrode lead is provided with a hollowed-out region;
wherein the array substrate further comprises a base substrate, the base substrate comprises a buffer layer and an insulation layer laminated one on another, the common electrode lead is located at a side of the insulation layer away from the buffer layer, and the insulation layer is arranged at a side of the common electrode lead away from the electronic paper film;
the buffer layer is provided with a concave-convex region at a side close to the insulation layer, each concave is depressed in a direction away from the common electrode lead, and each convex is protruded in a direction close to the common electrode lead; and
at least a part of the insulation layer and at least a part of the common electrode lead are deformed along with the concave-convex region of the buffer layer so as to form the hollowed-out region of the common electrode lead.

2. The electronic paper display module according to claim 1, wherein the common electrode lead is hollowed out at a part of the hollowed-out region.

3. The electronic paper display module according to claim 2, wherein the common electrode lead is a grid-shaped lead at the hollowed-out region.

4. The electronic paper display module according to claim 1, wherein the orthogonal projection of the electronic paper film onto the array substrate only covers the display region.

5. The electronic paper display module according to claim 4, wherein the base substrate is arranged at a side of the common electrode lead away from the electronic paper film;
a minimum distance between an edge line of the orthogonal projection of the electronic paper film onto the base substrate and an edge line of an orthogonal projection of the hollowed-out region onto the base substrate is a first predetermined spacing; and
the first predetermined spacing is greater than or equal to 10 microns and less than or equal to 200 microns.

6. The electronic paper display module according to claim 5, wherein the peripheral region comprises a first peripheral region and a second peripheral region, and the first peripheral region, the display region and the second peripheral region are arranged in a first direction;
the common electrode lead is arranged at the first peripheral region, and a maximum distance between a side of the edge line of the orthogonal projection of the electronic paper film onto the base substrate closest to the first peripheral region and the edge line of the orthogonal projection of the hollowed-out region onto the base substrate in the first direction is a first predetermined distance; or
the common electrode lead is arranged at the second peripheral region, and a maximum distance between a side of the edge line of the orthogonal projection of the electronic paper film onto the base substrate closest to the second peripheral region and the edge line of the orthogonal projection of the hollowed-out region onto the base substrate in the first direction is a second predetermined distance; or
the common electrode lead comprises a first common electrode lead and a second common electrode lead, the first common electrode lead is provided with a first hollowed-out region, the second common electrode lead is provided with a second hollowed-out region, the first common electrode lead is arranged at the first peripheral region, the second common electrode lead is arranged at the second peripheral region, a maximum distance between the side of the edge line of the orthogonal projection of the electronic paper film onto the base substrate closest to the first peripheral region and an edge line of an orthogonal projection of the first hollowed-out region onto the base substrate in the first direction is the first predetermined distance, and a maximum distance between the side of the edge line of the orthogonal projection of the electronic paper film onto the base substrate closest to the second peripheral region and an edge line of an orthogonal projection of the second hollowed-out region onto the base substrate in the first direction is the second predetermined distance, wherein the first predetermined distance is greater than or equal to 200 microns and less than or equal to 500 microns, and the second predetermined distance is greater than or equal to 200 microns and less than or equal to 500 microns.

7. The electronic paper display module according to claim 1, wherein the orthogonal projection of the electronic paper film onto the array substrate covers the display region, and completely covers a region where the common electrode lead is located, and the common electrode lead is a grid-shaped lead.

8. The electronic paper display module according to claim 7, wherein the base substrate is arranged at a side of the common electrode lead away from the electronic paper film;
the peripheral region comprises a first peripheral region and a second peripheral region, and the first peripheral region, the display region, and the second peripheral region are arranged in a first direction;
the common electrode lead is arranged at the first peripheral region, and a minimum distance between an edge line of an orthogonal projection of the electronic paper film onto the base substrate and an orthogonal projection of the common electrode lead onto the base substrate in the first direction is a third predetermined distance; or
the common electrode lead is arranged at the second peripheral region, and a minimum distance between the edge line of the orthogonal projection of the electronic paper film onto the base substrate and the orthogonal projection of the common electrode lead onto the base substrate in the first direction is a fourth predetermined distance; or
the common electrode lead comprises a first common electrode lead and a second common electrode lead, the first common electrode lead is arranged at the first peripheral region, the second common electrode lead is arranged at the second peripheral region, a minimum distance between the edge line of the orthogonal projection of the electronic paper film onto the base substrate and an orthogonal projection of the first common electrode lead onto the base substrate in the first direction is the third predetermined distance, and a minimum distance between the edge line of the orthogonal projection of the electronic paper film onto the base substrate and an orthogonal projection of the second common electrode lead onto the base substrate in the first direction is the fourth predetermined distance;
wherein the third predetermined distance is greater than or equal to 20 microns and less than or equal to 200 microns, and the fourth predetermined distance is greater than or equal to 20 microns and less than or equal to 200 microns.

9. The electronic paper display module according to claim 1, wherein the orthogonal projection of the electronic paper film onto the array substrate covers the display region, and partially covers a region where the common electrode lead is located.

10. The electronic paper display module according to claim 9, wherein a width of the hollowed-out region in the first direction is greater than or equal to 400 microns and less than or equal to 800 microns; and
the peripheral region comprises a first peripheral region and a second peripheral region, the common electrode lead is arranged at the first peripheral region and/or the second peripheral region, and the first peripheral region, the display region and the second peripheral region are arranged in the first direction.

11. The electronic paper display module according to claim 1, wherein an edge of the electronic paper film close to the array substrate is arc-shaped.

12. The electronic paper display module according to claim 1, wherein the common electrode lead is provided with a wavy or serrated edge.

13. The electronic paper display module according to claim 1, wherein the base substrate comprises a base and the base is arranged at a side of the insulation layer away from the common electrode lead;
the insulation layer is provided with a plurality of stress release grooves, and an orthogonal projection of each stress release groove onto the base is located at a periphery of an orthogonal projection of the common electrode lead onto the base; and
the orthogonal projection of each stress release groove onto the base is rectangular, and each stress release groove is depressed in a direction away from the common electrode lead.

* * * * *